(12) United States Patent
Ehrlich et al.

(10) Patent No.: US 9,626,280 B2
(45) Date of Patent: Apr. 18, 2017

(54) DEBUG METHOD AND DEVICE FOR HANDLING EXCEPTIONS AND INTERRUPTS

(71) Applicants: Robert N. Ehrlich, Round Rock, TX (US); Robert A. McGowan, Cedar Park, TX (US); Michael B. Schinzler, Austin, TX (US)

(72) Inventors: Robert N. Ehrlich, Round Rock, TX (US); Robert A. McGowan, Cedar Park, TX (US); Michael B. Schinzler, Austin, TX (US)

(73) Assignee: NXP USA, INC., Austin, TX (US)

( * ) Notice: Subject to any disclaimer, the term of this patent is extended or adjusted under 35 U.S.C. 154(b) by 692 days.

(21) Appl. No.: 13/932,189

(22) Filed: Jul. 1, 2013

(65) Prior Publication Data

US 2015/0006869 A1    Jan. 1, 2015

(51) Int. Cl.
G06F 9/00    (2006.01)
G06F 9/44    (2006.01)
G06F 11/36   (2006.01)

(52) U.S. Cl.
CPC ................. G06F 11/3636 (2013.01)

(58) Field of Classification Search
None
See application file for complete search history.

(56) References Cited

U.S. PATENT DOCUMENTS

| | | | |
|---|---|---|---|
| 6,453,411 B1 * | 9/2002 | Hsu ....................... | G06F 9/3802 711/202 |
| 7,752,425 B2 | 7/2010 | Williams et al. | |
| 7,966,479 B1 * | 6/2011 | Thaik .................. | G06F 9/30189 712/234 |
| 7,992,052 B2 | 8/2011 | Moyer et al. | |
| 8,032,710 B1 * | 10/2011 | Ashcraft ............. | G06F 9/30072 711/133 |

(Continued)

OTHER PUBLICATIONS

ARM Limited, "CoreSight Program Flow Trace: Architecture Specification, v1.0," ARM IHI 0035A, copyright 1999-2002, 2004-2008, ARM Ltd; printed from <<http://infocenter.arm.com/help/topic/com.arm.doc.ihi0035b/IHI0035B_cs_pft_v1_1_architecture_spec.pdf>> on Feb. 21, 2013, 288 pages.

(Continued)

Primary Examiner — Michael Sun

(57) ABSTRACT

A method and information processing system provide trace compression for trace messages. In response to a branch of a conditional branch instruction having not been taken or having been taken, a flag of a history buffer is set or cleared. A trace address message is generated in response to a conditional indirect branch instruction being taken, wherein the trace address message includes address information indicating the destination address of the taken branch, and an index value indicating a corresponding flag of the history buffer. In response to a return from interrupt or return from exception instruction, a predicted return address is compared to an actual return address. A trace address message is generated in response to the predicted and actual return addresses not matching. A trace address message is not generated in response to the predicted and actual return addresses matching.

20 Claims, 7 Drawing Sheets

(56) References Cited

U.S. PATENT DOCUMENTS

| | | | | |
|---|---|---|---|---|
| 8,037,285 B1 * | 10/2011 | Thaik | ................... | G06F 9/30189 |
| | | | | 712/211 |
| 8,886,920 B2 * | 11/2014 | Olson | ........................... | 712/237 |
| 2005/0010912 A1 * | 1/2005 | Adolphson | ............ | G06F 8/4441 |
| | | | | 717/151 |
| 2012/0233442 A1 * | 9/2012 | Shah | ..................... | G06F 9/3806 |
| | | | | 712/207 |
| 2012/0290820 A1 * | 11/2012 | Olson | ................... | G06F 9/3806 |
| | | | | 712/233 |

OTHER PUBLICATIONS

U.S. Appl. No. 13/932,183, McGowan, R. et al., "Debug Method and Device for Providing Indexed Trace Messages", Office Action—Non-Final Rejection, mailed Feb. 26, 2016.

U.S. Appl. No. 13/932,183, McGowan, R. et al., "Debug Method and Device for Providing Indexed Trace Messages", Office Action—Notice of Allowance, mailed Sep. 22, 2016.

U.S. Appl. No. 13/932,183, Mcgowan, R. et al., "Debug Method and Device for Providing Indexed Trace Messages", Office Action—Notice of Allowance, mailed Dec. 21, 2016.

* cited by examiner

DEBUG METHOD AND DEVICE FOR HANDLING EXCEPTIONS AND INTERRUPTS

CROSS-REFERENCE TO RELATED APPLICATION(S)

The present application is related to co-pending U.S. patent application Ser. No. 13/932,183, entitled "DEBUG METHOD AND DEVICE FOR PROVIDING INDEXED TRACE MESSAGES," filed on an even date herewith, the entirety of which is herein incorporated by reference.

BACKGROUND

Field of the Disclosure

This disclosure relates generally to debugging facilities for an information processing system and, more specifically, to debug trace messaging.

Description of the Related Art

New software may be developed using software development tools. Such tools can include an external debugger connected to a data processor, via a debug interface of the processor, to determine instructions executed by the data processor, and to present a representation of the executed instructions to a user. The execution of instructions at the data processor is monitored by a debug processing module of the data processor during a debug trace mode. During debug trace mode, the debug processing module can maintain instruction flow history information that is indicative of the executed instructions. Since data processors can execute instructions very quickly, such history information can represent large numbers of executed instructions, therefore, it is desirable to reduce in the amount of history information that is communicated between the debug processing module and the external debugger to reduce bandwidth requirements.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Figure 1:
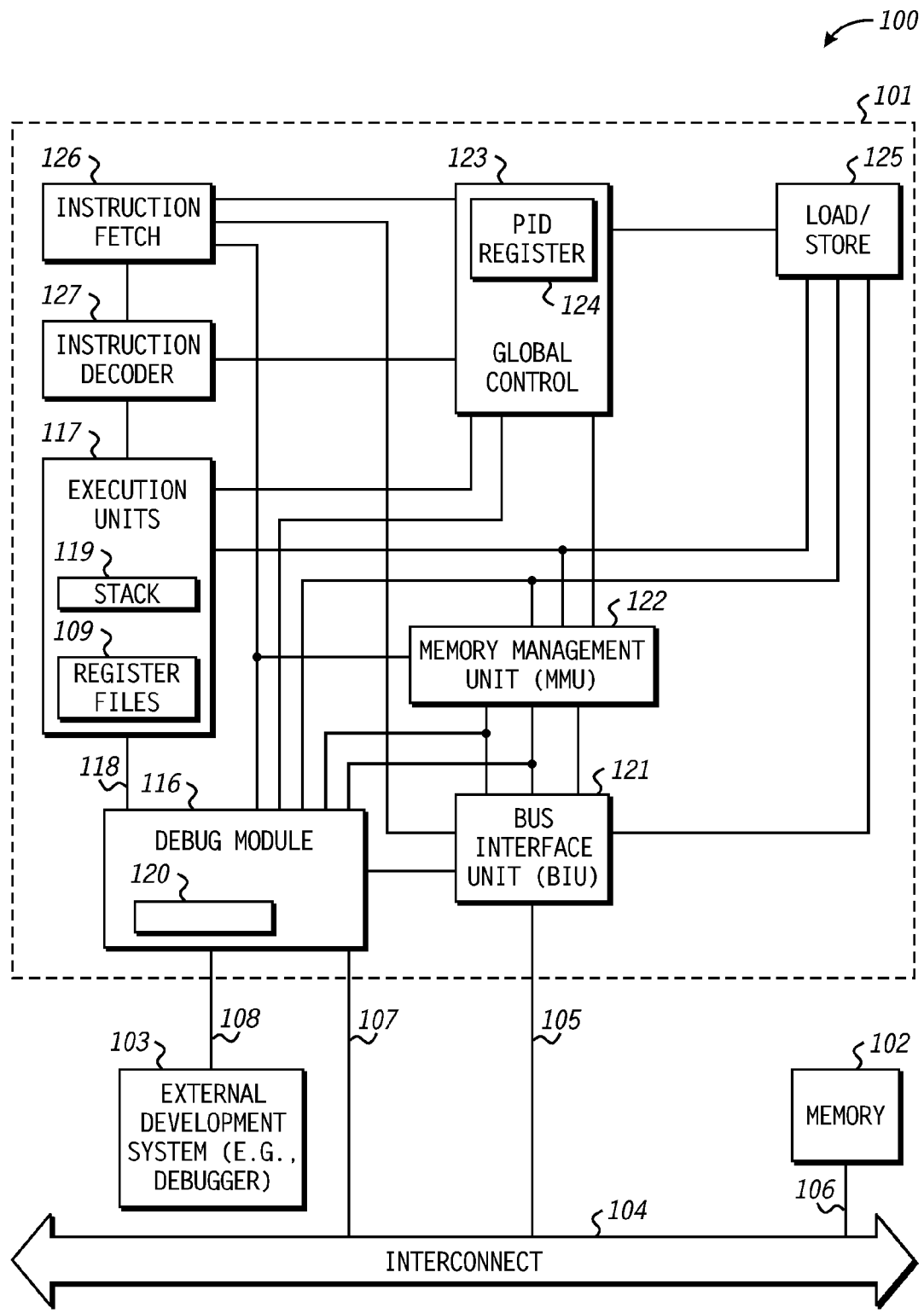
FIG. 1 illustrates a block diagram illustrating a data processing system in accordance with at least one embodiment.

A data processing system is disclosed that includes trace debugging capabilities to facilitate debugging of program code for a data processor. A debug module of the data processor maintains a history buffer, referred to as an Instruction Flow history Flag Buffer (IFFB), having a plurality of flags, each of which corresponds to a particular instruction that typically affects program flow, such as a branch instruction. The IFFB stores instruction flow history information, such as branch information, that indicates whether branches of executed branch instructions were taken or not taken. For example, each executed branch instruction can correspond to a specific bit location of the IFFB where a flag is stored, wherein the flag is set if the branch of its corresponding branch instruction is taken (the branch instruction was taken), and the flag is cleared if the branch was not taken (the branch instruction was not taken).

So long as the destination address of each taken branch instruction is deterministic, the external debugger, by virtue of having a copy of the executing source code, can determine the instruction flow through the data processor based upon the IFFB flags. However, when a branch is an indirect branch, such when a conditional indirect branch instruction is executed, the branch destination is indeterminate with respect to the external debugger, and address information that indicates the destination address of the taken branch needs to be provided. Typically this is accomplished by generating and transmitting a trace address message to the external debugger that includes both the valid IFFB flags and the branch destination address information to the external debugger. Based upon the IFFB flags, the external debugger can determine which executed instruction caused the information to be communicated, and can use the transmitted destination address information to determine the branch address of the taken conditional indirect branch instruction.

According to a particular embodiment disclosed herein, instead of transmitting the IFFB information and destination address information together in the trace address message, the destination address information is transmitted without including the valid IFFB flags, and instead includes an index identifying a specific flag of the IFFB (an indexed flag), which is transmitted independent of the trace address message, such as in a subsequent trace history message. Thus, for a particular taken branch instruction, the destination address information and an index identifying a particular flag location of the IFFB can be transmitted to the external debugger as part of a trace address message, while the IFFB having a flag referenced by the index of the trace address can be transmitted to the external debugger, as part of a trace history message, in response to the IFFB being subsequently filled. The use of indexed trace messages in this manner can result in a reduction of debug information needed to be transmitted.

According to another embodiment of implementing debug processing, disclosed herein, an exception/interrupt causes a trace address message that identifies the instruction that was being executed when the exception/interrupt occurred to be transmitted to an external debugger. In addition, the exception/interrupt causes a return address to be pushed onto a stack of the data processor, and to be stored by a debug processing module as a predicted return address. In response to a Return From Exception (RFE) instruction, or a Return From Interrupt (RFI) instruction, being executed, the debug module compares the predicted address to the actual return address that resulted. If the addresses match, there is no need for the debug module to generate a trace address message to report the return address, as an external debugger can determine that return processing will continue at a deterministic location relative to the instruction that was executing when the exception/interrupt occurred. However, if the addresses don't match, the debug module of the data processor will transmit an address trace message to the external debugger providing address information used by the external debugger to determine the actual return address.

FIG. 1 is a block diagram illustrating a data processing system 100 in accordance with at least one embodiment. Data processing system 100 includes data processor 101, memory 102, debugger 103, and interconnect 104. Data processor 101 includes global control unit 123, load/store unit 125, memory management unit (MMU) 122, bus interface unit (BIU) 121, instruction fetch unit 126, instruction decoder 127, execution units 117, and debug module 116.

Global control unit 123 is illustrated to include a process identifier (PID) register 124, and is connected to load/store unit 125, to MMU 122, to instruction fetch unit 126, to instruction decoder 127, to execution units 117, and to debug module 116. MMU 122 is further connected to instruction fetch unit 126, to debug module 116, and to BIU 121. Instruction fetch unit 126 is further connected to instruction decoder 127 and to BIU 121. Instruction decoder 127 is further connected to execution units 117. Execution units 117 can access a stack 119, and are further connected, via connection 118, to debug module 116. BIU 121 is further connected to debug processor module 116 and, via connection 105, to interconnect 104. Debug module 116 includes storage locations 120 that can store address predictions for return from exception/interrupt commands, and is further connected, via connection 108, to external debugger 103 (e.g., external development system, and, via connection 107, to interconnect 104. Memory 102 is connected to interconnect 104 via connection 106.

In operation, data processor 101 can communicate with memory 102 and other devices (not shown) via interconnect 104. Information communicated between memory 102 and other devices, such as load/store 125 and MMU 122, can transfer through BIU 121. Instruction fetch unit 126 retrieves data processor instructions from BIU 121 under control of global control module 123. The retrieved instructions are communicated to instruction decoder 127 for decoding, which can occur under control of global control module 123. Execution units 117 execute instructions and generate data that can be stored in register files 109, a stack 119, a cache (not shown), or placed in the memory 102 (via global control module 123, BIU 121 and interconnect 104). Debugging the operation of data processor 101 and data processing system 100 is facilitated by the use of debug module 116, which, upon entering a debug mode of operation, can generate debug messages that include debug information for analysis by external development system (debugger) 103.

External debugger 103 may be implemented in a variety of ways. As examples, external debugger 103 may be a debugger integrated with a software development system, a debugger that may support multiple types of processors, a specific-purpose debugger for utilizing a processor for a type of application, a specific-purpose debugger for obtaining, storing, and transmitting program trace information, a debugger for receiving trace messages and displaying the information they contain (with or without decoding the information to be displayed), and the like.

Figure 2:
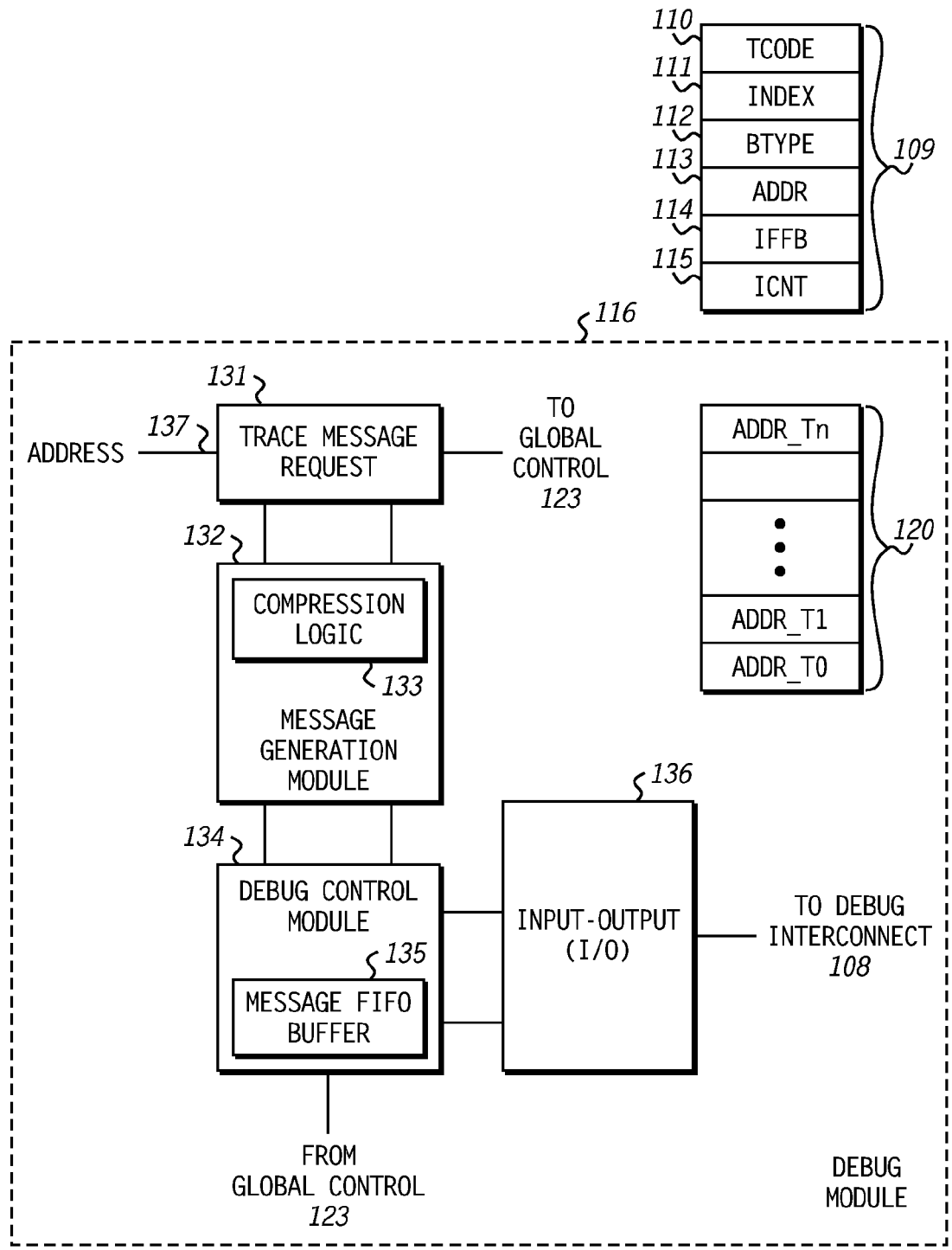
FIG. 2 illustrates a block diagram illustrating a debug module of a data processor of FIG. 1 and various storage locations in accordance with at least one embodiment.

FIG. 2 is a block diagram illustrating a more detailed view of a particular embodiment of debug module 116, of register file 109, which includes registers 110-115, and of storage locations 120, which by way of example is illustrated as residing local to the debug module 116 for quick access.

Debug module 116 includes trace message request module 131, message generation module 132, debug control module 134, and input-output (10) module 136. Various connections to the execution units of FIG. 1 can provide information to the components of FIG. 2. For example, connection 137 is specifically illustrated in FIG. 2 that provides one or more addresses from the data processor system of FIG. 1 to the trace message request module 131, and a connection between the trace message request module 131 and the global control module 123 is also specifically illustrated at FIG. 2. It will be appreciated that other connections to the block diagram of FIG. 2 can exist. Message generation module 132 is capable of generating debug messages, referred to as trace messages, that transmit various information to the external debugger 103 in response to requests from trace message request module 131. One type of trace message is a trace address message, which as used herein is intended to refer to a trace message that provides address information that can be used to determine the address of a particular instruction. Another type of trace message is a trace history message, which for example, can provide IFFB flag information that can be used to determine the instructions executed by a data processor.

By way of example, various debug/trace information that can be transmitted as part of a trace message are illustrated as stored at registers 110-115. Debug/trace information specifically illustrated includes: a TCODE value, stored at register 110, that identifies a particular type of message to be sent from debug module 116 to an external debugger; a BTYPE value, stored at register 112, that identifies a type associated with a particular encountered event that is associated with the trace message, such as a branch type, an interrupt, an exception, and the like; IFFB information, stored at register 114 that stores trace history information such as whether specific branches are taken or not taken; direct address information ADDR, stored at register 113, that identifies a particular address, such as a destination address of a branch; an INDEX value (pointer) that identifies the location of a particular flag of the IFFB, which in turn is associated with a particular instruction or other flow event; an ICNT value, stored at register 115, that may store offset information, such as a number of instructions or addresses, that can be used to identify a specific instruction or address location relative to a branch instruction that corresponds to the INDEX value. For convenience, the data mnemonic of each of the registers 110-115 can also be used herein to refer to the register itself. For example, the index register would be understood to refer to the register 111.

Thus, it will be appreciated, that as execution units 117 execute instruction code, debug module 116 can obtain information about the execution of those instructions via various connections and store the information in registers 110-115. When debug module 116 has information to send to debugger 103, a debug message can be generated and send to a trace message with the pertinent information.

The information described as being stored in registers 110-115 does not necessarily need to be stored in registers. Some or all of such values may be made available for inclusion in a trace message directly, for example, by the outputs of circuitry such as combinational logic or the like. Trace messages, or information used to generate trace messages (e.g., values described with respect to registers 110-115), may be stored in trace buffers (e.g., first-in-first-out (FIFO) buffers) before being transmitted via connection 108. Multiple instances of such trace buffers may be employed and may be configured in series, in parallel, or in a combination thereof, with each other. For example, debug control module 134 may include a first-in-first-out (FIFO) buffer 135 to store trace messages in a particular order for communication to an external debugger. A particular manner of collecting and transmitting instruction flow history information, and generating trace messages having index values that reference the instruction flow history information, will be better understood with reference to the following figures.

Figure 3:
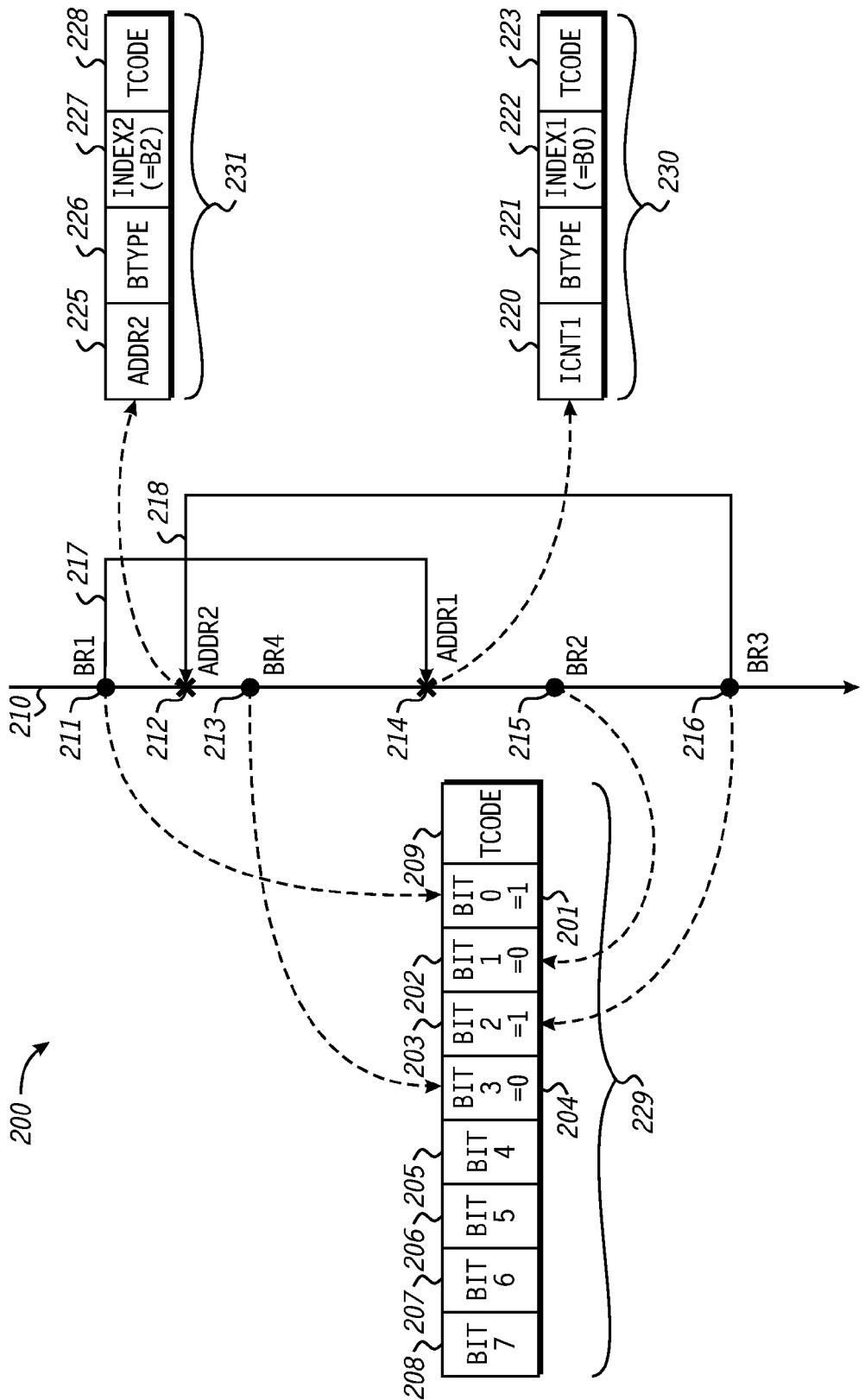
FIG. 3 illustrates a block diagram that represents a plurality of instructions in linear address space in accordance with a specific example.

FIG. 3 is a block diagram including a line 210 that represents a plurality of instructions in linear address space that result in a particular instruction flow, and a set of trace messages (229-231) that are generated based upon the instruction flow. It will be appreciated, that line 210 can represent instruction code that is arranged in an order of normally advancing instruction execution (e.g., the order of execution when a program counter is incremented from an instruction to an immediately succeeding instruction). Branch instructions of the illustrated instruction code 210 are represented by points 211, 213, 215, and 216. As instructions are executed, conditional branch instructions can either be taken to another memory address other than the memory address that immediately follows the conditional branch instruction, or not taken and simply continue sequentially to the memory address that immediately follows. It will be appreciated that various fields of the debug trace messages 229-231 can correspond to various information stored at register file 109, where trace information can be stored prior to generation of the particular messages 229-231.

As instruction flow proceeds along line 210, each encountered branch instruction is associated with a next available bit in the IFFB, where each associated bit represents a flag that indicates whether the branch was taken or not taken for its corresponding instruction. Note that message 229 represents a trace history message having a TCODE 209, and a predetermined number of flags, and is generated in response to each of the available IFFB flag bits (bit 0 through bit 7) being valid, e.g., each IFFB bit is associated with a particular instruction or flow event. Once the trace history message is generated, the IFFB can be cleared. By way of example, if the branch of an executed branch instruction is not taken, the branch instruction's corresponding IFFB flag is cleared, e.g., programmed to a logic zero. Otherwise, if the branch of the executed branch instruction is taken, the branch instruction's corresponding IFFB flag is set, e.g., programmed to a logic one.

No branch destination address information needs to be sent to an external debugger when a branch is not taken, as flow continues at the address following the instruction. Similarly, no additional branch destination address information needs to be sent to an external debugger when a conditional direct branch is taken, as the destination address of a direct branch is known by the external debugger by virtue of it having a copy of the source instruction code inherently known at compile time. However, the destination address of a branch is not inherently known by the external debugger when a conditional indirect branch is taken. Therefore, a trace address message that includes additional address information identifying the branch destination address needs to be generated for communication to the external debugger. It will be appreciated that address information of a taken indirect conditional branch can be communicated directly as an address value, or indirectly as an offset relative a predetermined point of reference.

At FIG. 3, branch instruction 211 will eventually be executed by the data processor executing instruction code 210. Assuming branch instruction 211 is a conditional indirect branch instruction, its execution is evaluated to determine whether or not its branch (BR1) was taken or not taken. In the example shown, the branch has been taken, causing instruction flow to progress to a destination instruction 214 at a destination address ADDR1. Thus, assuming the IFFB is empty prior to at the execution of branch instruction 211, the first flag of the IFFB (BIT 0) of message 229 is set. Other branch specific information, as previously described, can be stored in various registers, including the destination address (ADDR1), which can be stored in register 113. Note that by virtue of the external debugger having a source copy of the code being executed, the external debugger knows that BIT 0 of the IFFB corresponds to branch instruction 211.

According to an embodiment, no trace history message will be generated to communicate the contents of the IFFB to the external debugger at this time because the IFFB is not full subsequent to branch instruction 211 being executed. This is different than other debug techniques that transmit valid flags from the IFFB and address information in response to each conditional indirect branch that is taken so that the external debugger can correlate the last executed branch instruction, indicated by the IFFB data, to the address information, which identifies the branch destination.

While the IFFB information is not communicated to the external debugger in response to the branch being taken, a trace address message 230 is generated that indicates the destination address of the taken branch of instruction 211. In the illustrated embodiment, the trace address message 230 includes information TCODE, BTYPE, and information that includes INDEX1 and ICNT.

The INDEX of the trace message indicates that the message 230 identifies BIT 0 of the IFFB, thereby allowing the external debugger to correlate the trace address message 230 specifically to the branch instruction 211. This allows the external debugger to associate the address information of trace address message 230 with branch of instruction 211. Trace address message 230 can be referred to as an incremental trace address message, as its address information includes ICNT1, which provides an incremental instruction/address count that is added to the address of the branch instruction 211 identified by the INDEX. It will be appreciated that a direct trace address message that provides an actual address (ADDR) can be generated instead of an incremental trace address message.

Instruction code execution continues from instruction 214 and arrives at a conditional branch instruction 215. The condition of the conditional branch instruction 215 is evaluated to determine whether or not the branch is to be taken. In the example shown, it is determined that the branch BR2 from conditional branch instruction 215 is not taken, and therefore there is no branch destination address to report. A second flag (BIT 1) of the IFFB is cleared, indicating the branch was not taken, and flow continues without generating another trace message at this time.

From conditional branch instruction 215, instruction code execution continues and arrives at conditional branch instruction 216. In the example shown, it is determined that branch BR3 from conditional branch instruction 216 is to be taken to instruction 202. Thus, the third flag (BIT 2) of the IFFB is set, and the destination address (ADDR2) of conditional branch instruction 216 is stored for transmission as part of a trace address message 231. Trace message 231 can be referred to as a direct address trace address message as it sends the actual address of the destination location, as opposed to an incremental count of instructions or addresses.

Instruction code execution continues and arrives at conditional branch instruction 213. In the example shown, it is determined that branch BR4 of conditional branch instruction 213 is not to be taken. Thus, the fourth flag (BIT 3) of the IFFB is cleared and execution of the instruction code continues with the instruction following conditional branch instruction 213.

As execution continues and additional conditional branch instructions are encountered (which may include subsequent instances of the same conditional branch instructions illustrated at FIG. 3), additional flags in the instruction flow history flag buffer are programmed to values representative of whether or not encountered branches were taken or not taken. As additional conditional indirect branch instructions are encountered and their branches are taken, additional trace messages with indirect branch information are sent from the processor to the debugger. When all of the IFFB bits are valid, e.g., a predetermined fullness threshold criteria is met, a trace history message 229 is generated that includes the IFFB content and a corresponding TCODE value that indicates to the external debugger that the message includes the IFFB information. Once the IFFB content has been captured for transmission as part of trace message, it can be cleared, e.g. all flags are invalid.

The manner in which various trace messages are constructed and communicated to external debugger 103 will be further understood with reference to the exemplary pseudocode listing of Table 1, where each row corresponds to a particular instruction of an instruction flow.

column indicates there is a corresponding IFFB flag at the bit location indicated by the integer. The next column, labeled Comment, indicates whether various branch instructions were taken or not taken. The last column, labeled Trace MSG Type, indicates those trace messages generated in response to the instruction being executed, if any.

Execution of the exemplary pseudocode of Table 1 begins at label event loop (address 0x100) at a time when none of the IFFB flags have been determined. A non-branch instruction is executed at address 0x100 that does not result in any changes to the IFFB, nor is a trace message generated. Note that that by way of example, that none of the eight bits of the IFFB contain any valid information as represented by the eight "x" indicators. Thus the IFFB is 8'xxxxxxxx. Also, the value in the Index column of address 0x100 is "X" because the non-branch instruction is not associated with any of the flags of the IFFB. From address 0x100, execution proceeds to address 0x104, where another instruction is executed.

The instruction executed at address 0x104 is a non-branch instruction, and therefore does not affect the IFFB, nor does any address information need to be transmitted. From address 0x104, execution proceeds to address 0x108, where another instruction is executed.

The instruction executed at address 0x108 is a conditional direct branch instruction that is taken. Because the branch is taken, the value in the Index column is zero (0) to indicate that the conditional direct branch instruction at address 0x108 corresponds to the first bit (BIT 0) of the IFFB, which is now set (1) to indicate the branch was taken. Because the conditional branch was a direct branch, the branch destination is inherently known by the external debugger, e.g., as a part of the source code, and there is no need to provide any additional destination address information. Thus, no trace message is generated at this time, as indicated in the TRACE

TABLE 1

| Label | Address | Instruction Type | IFFB | Index | Comment | Trace MSG Type |
|---|---|---|---|---|---|---|
| event_loop: | 0x100 | INSTR | 8'bxxxxxxxx | X | | |
| | 0x104 | INSTR | 8'bxxxxxxxx | X | | |
| | 0x108 | CBRDirect | 8'bxxxxxxx1 | 0 | Taken | None |
| jmp_table: | 0x200 | INSTR | 8'bxxxxxxx1 | X | | |
| | 0x204 | CBRIndirect | 8'bxxxxxx01 | 1 | Not taken | |
| | 0x208 | INSTR | 8'bxxxxxx01 | X | | |
| | 0x20C | CBRIndirect | 8'bxxxxx001 | 2 | Not taken | |
| | 0x210 | INSTR | 8'bxxxxx001 | X | | |
| | 0x214 | CBRIndirect | 8'bxxxx1001 | 3 | Taken | AM(3) |
| do_something: | 0x300 | INSTR | 8'bxxxx1001 | X | | |
| | 0x304 | CBRDirect | 8'bxxx11001 | 4 | Taken | |
| | 0x30C | INSTR | 8'bxxx11001 | X | | |
| | 0x310 | CBRIndirect | 8'bxx111001 | 5 | Taken | AM(5) |
| | 0x218 | INSTR | 8'bxx111001 | X | | |
| | 0x21C | CBRDirect | 8'bx1111001 | 6 | Taken | |
| | 0x10C | INSTR | 8'bx1111001 | X | | |
| | 0x110 | CBRDirect | 8'b11111001 | 7 | Taken | HM |
| | 0x100 | INSTR | 8'bxxxxxxxx | X | | |

A first column of Table 1, "Labels", identifies labels associated with various address locations of the pseudocode. A next column, labeled Address, indicates the address of a corresponding instruction. A next column, labeled Instruction Type, includes a mnemonic identifying various pseudocode instructions. A next column, labeled IFFB, indicates the IFFB contents based upon the instruction at the same row being executed. A next column, labeled Index, indicates whether an instruction has a corresponding IFFB flag, where an "X" in the Index column indicates there is no corresponding IFFB flag for the instruction, and an integer in the Index MSG TYPE column. The taken branch instruction at address 0x108 results in a jump to label jmp_table (address 0x200), where execution continues.

The instruction executed at address 0x200 is a non-branch instruction, and therefore does not affect the IFFB, nor does any address information need to be transmitted. From address 0x200, execution proceeds to address 0x204.

The instruction executed at address 0x204 is a conditional indirect branch instruction that is not taken. Because the branch is not taken, the value in the Index column is one (1) to indicate that the conditional indirect branch at address 0x204 corresponds to the second bit (BIT 1) of the IFFB, which is now cleared (0) to indicate the branch was not taken. Instruction flow continues at the next instruction, which is at address 0x208. Note that after an external debugger receives the IFFB information that it will be able to determine that the instruction at address 0x204 was not taken, and determine proper instruction flow to address 0x208.

The instruction executed at address 0x208 is a non-branch instruction, and therefore does not affect the IFFB, nor does any address information need to be transmitted. From address 0x208, execution proceeds to address 0x20C, where another instruction is executed.

The instruction executed at address 0x20C is a conditional indirect branch instruction that is not taken. Because the branch is not taken, the next bit (BIT 2) of the IFFB is cleared, and the value in the Index column has the value two (2) to indicate that the conditional indirect branch instruction corresponds to IFFB bit BIT 2. Flow continues with the instruction at address 0x210, and no trace message is generated.

The instruction executed at address 0x210 is a non-branch instruction, and therefore does not affect the IFFB, nor does any address information need to be transmitted. From address 0x210, execution proceeds to address 0x214, where another instruction is executed.

The instruction executed at address 0x214 is a conditional indirect branch instruction that is taken, resulting in flow continuing at address 0x300. Because the branch is taken, the next bit (BIT 3) of the IFFB register is set, and the value in the Index column is three (3) to indicate that the conditional indirect branch instruction corresponds to IFFB bit BIT 3. Because the branch was an indirect branch, the branch destination cannot be determined by the external debugger without more information. Thus, a trace address message with an INDEX identifying bit BIT 3 of the IFFB will be generated and provided to the external debugger. Column Trace MSG Type includes a mnemonic AM(3) that represents the trace address message, where "AM" indicates a trace message includes an address, e.g., address 0x300, and "(3)" indicates that the trace address message is associated with BIT 3 of the IFFB. The taken branch from address 0x214 results in a jump to label do_something (address 0x300), where execution continues.

Execution of a particular sequence of instructions continues to be executed, beginning at the target address 0x300, yielding the various results indicated in Table 1, in the manner described above, until reaching address 0x110. The instruction executed at address 0x110 is a conditional direct branch that is taken, resulting in flow continuing at address 0x100. Because the branch is taken, the next bit (BIT 7) of the IFFB is set, as also indicated by the value seven (7) in the INDEX column. Because the branch instruction at address 0x110 is a direct branch, there is no need to provide additional destination information to the external debugger. However, because the IFFB is now full, e.g., all eight bits of the IFFB are valid, the contents of the IFFB register is be provided to the external debugger using a trace history message, which is represented by the designator "HM" in the column labeled Trace MESSAGE Type. In response, the IFFB, is cleared, as represented by the designator 8'bxxxxxxxx in the IFFB column.

Table 2 illustrates an exemplary pseudo code listing that is the same as that described with respect to Table 1, except the branch instruction at address 0x110 is a conditional indirect branch instruction that is taken, as opposed to a conditional direct branch instruction. As a result of the conditional indirect branch instruction being taken at address 0x110, a trace address message AM(7) is generated, having a destination address of 0x100, as is the trace history message HM. In response to the IFFB buffer being filled.

TABLE 2

| Label | Address | Instruction Type | IFFB | Index | Comment | Trace Msg Type |
|---|---|---|---|---|---|---|
| event_loop: | 0x100 | INSTR | 8'bxxxxxxxx | X | | |
| | 0x104 | INSTR | 8'bxxxxxxxx | X | | |
| | 0x108 | CBRDirect | 8'bxxxxxxx1 | 0 | Taken | None |
| jmp_table: | 0x200 | INSTR | 8'bxxxxxxx1 | X | | |
| | 0x204 | CBRIndirect | 8'bxxxxxx01 | 1 | Not taken | |
| | 0x208 | INSTR | 8'bxxxxxx01 | X | | |
| | 0x20C | CBIindirect | 8'bxxxxx001 | 2 | Not taken | |
| | 0x210 | INSTR | 8'bxxxxx001 | X | | |
| | 0x214 | CBRIndirect | 8'bxxxx1001 | 3 | Taken | AM(3) |
| do_something; | 0x300 | INSTR | 8'bxxxx1001 | X | | |
| | 0x304 | CBRDirect | 8'bxxx11001 | 4 | Taken | |
| | 0x30C | INSTR | 8'bxxx11001 | X | | |
| | 0x310 | CBRIndirect | 8'bxx111001 | 5 | Taken | AM(5) |
| | 0x218 | INSTR | 8'bxx111001 | X | | |
| | 0x21C | CBRDirect | 8'bx1111001 | 6 | Taken | |
| | 0x10C | INSTR | 8'bx1111001 | X | | |
| | 0x110 | CBIindirect | 8'b11111001 | 7 | Taken | HM, AM(7) |
| | 0x100 | INSTR | 8'bxxxxxxxx | X | | |

It will be appreciated, that the use of trace address messages having index values that reference specific IFFB flags allows an external debugger to attribute destination address information of the trace address message to a particular branch instruction that is associated with the indexed branch history bit (flag) identified, even when the IFFB flag information and the destination address information are received at different times. Thus, it will be appreciated, that the trace address messages and trace history messages are generated independent of one another, e.g., trace history messages are generated in response to the IFFB being full, and trace address messages are generated in response to an indirect branch being taken. It will also be appreciated that other types of trace messages can be correlated to specific instructions by through the use of IFFB flag indexes, as will be better understood with reference to the debug timestamp messages described in greater detail below.

Figure 4:
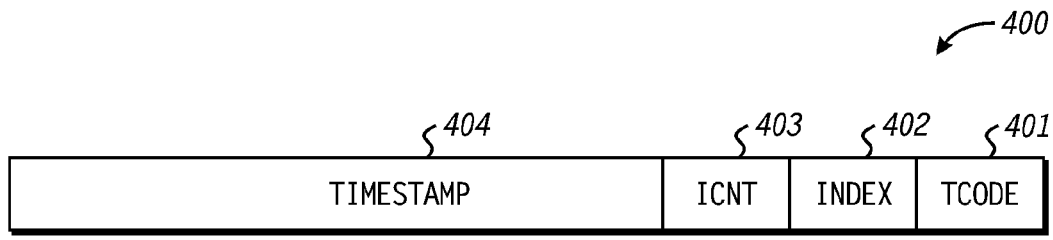
FIG. 4 illustrates a block diagram representing a trace message including a timestamp value in accordance with at least one embodiment.

FIG. 4 illustrates a block diagram representing a trace timestamp message 400 that includes a timestamp value (TIMESTAMP) that corresponds to particular a particular event. The event causing the timestamp to be generated can be identified in the trace timestamp message by a particular BTYPE (not shown) or TCODE. The instruction that was executing at the time that the timestamp was generated can be communicated to an external debugger using an index value (INDEX) and an instruction/address increment value (ICNT). In particular, the index value can identify a specific bit of the IFFB that corresponds to the last executed branch instruction prior to the interrupt occurring, and ICNT represents the number of instructions/addresses that occurred between the identified last executed branch instruction and when the timestamp event occurred. Therefore, because the external debugger can correlate each specific bit of the IFFB to a particular source code instruction, the instruction being executed when the timestamp was generated can be determined by counting forward a number of instructions/addresses, ICNT, from the last executed branch instruction as identified by the INDEX field of the timestamp message.

The ability to associate a trace message with a specific executed instruction by including an index value that identifies a particular IFFB flag, which in turn corresponds to a particular instruction, allows for the debug module of data processor to completely fill the IFFB before generating a trace history message to communicate its contents. This can be advantageous over other trace messaging techniques that provide branch history information and branch destination address information together, or in a fixed relationship to each other, in response to a conditional indirect branch being taken. The ability to transmit full IFFBs, separate from trace address messages having destination address information for taken branches can reduce the overall trace messaging bandwidth needed used to communicate information to an external debugger.

By way of example, the use of trace messages having index values as described above is used with the particular embodiment of debug processing described below, which handles exceptions/interrupts in a manner that can also reduce the amount of trace message information. It will be appreciated, however, that the exception/interrupt debug processing technique described below can also be used with debug systems that do not support trace messages with indexes, as described above.

Figure 5:
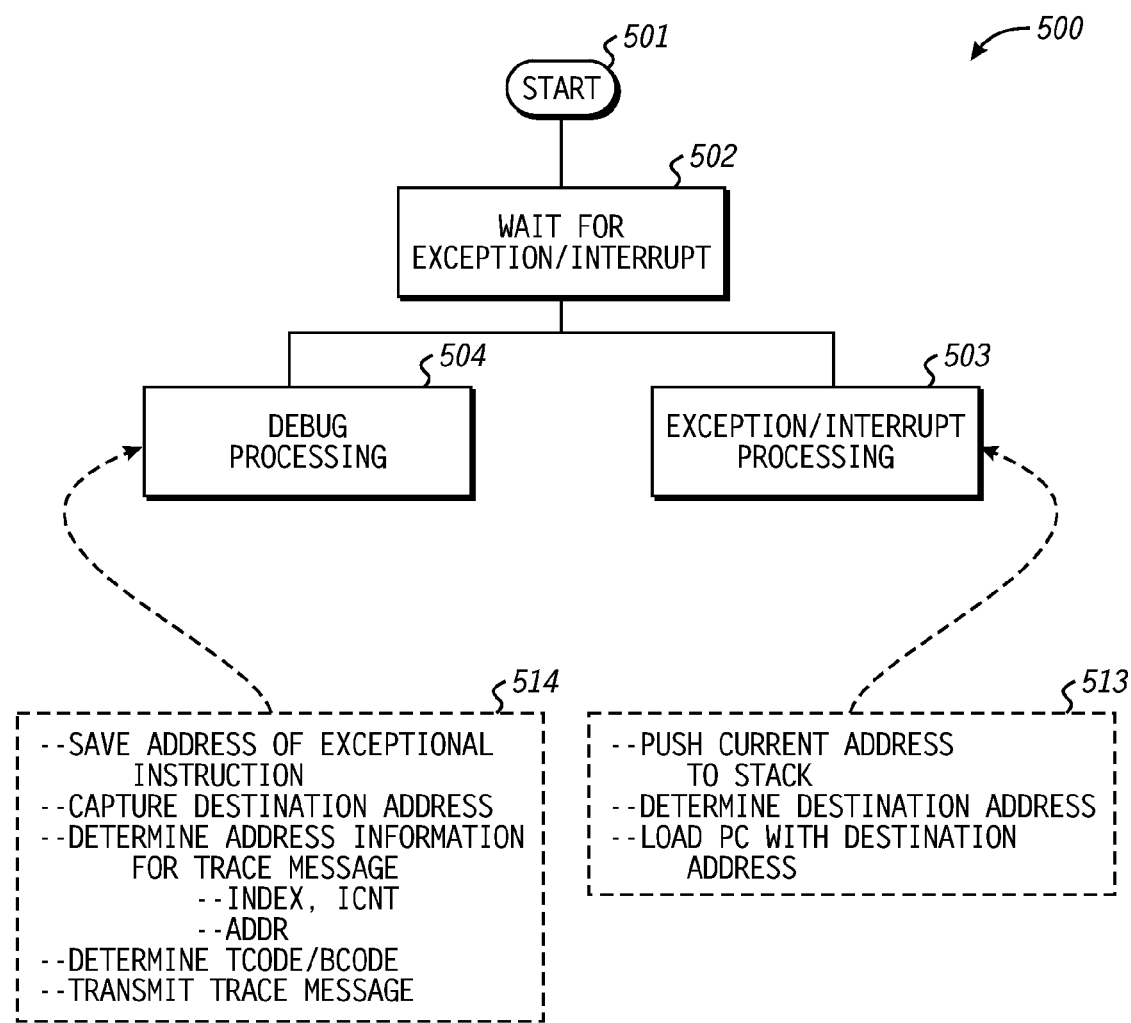
FIG. 5 illustrates a flow diagram illustrating a particular embodiment of handling exceptions/interrupts by a debug processing module and an exception/interrupt processing module in accordance with at least one embodiment.
Figure 6:
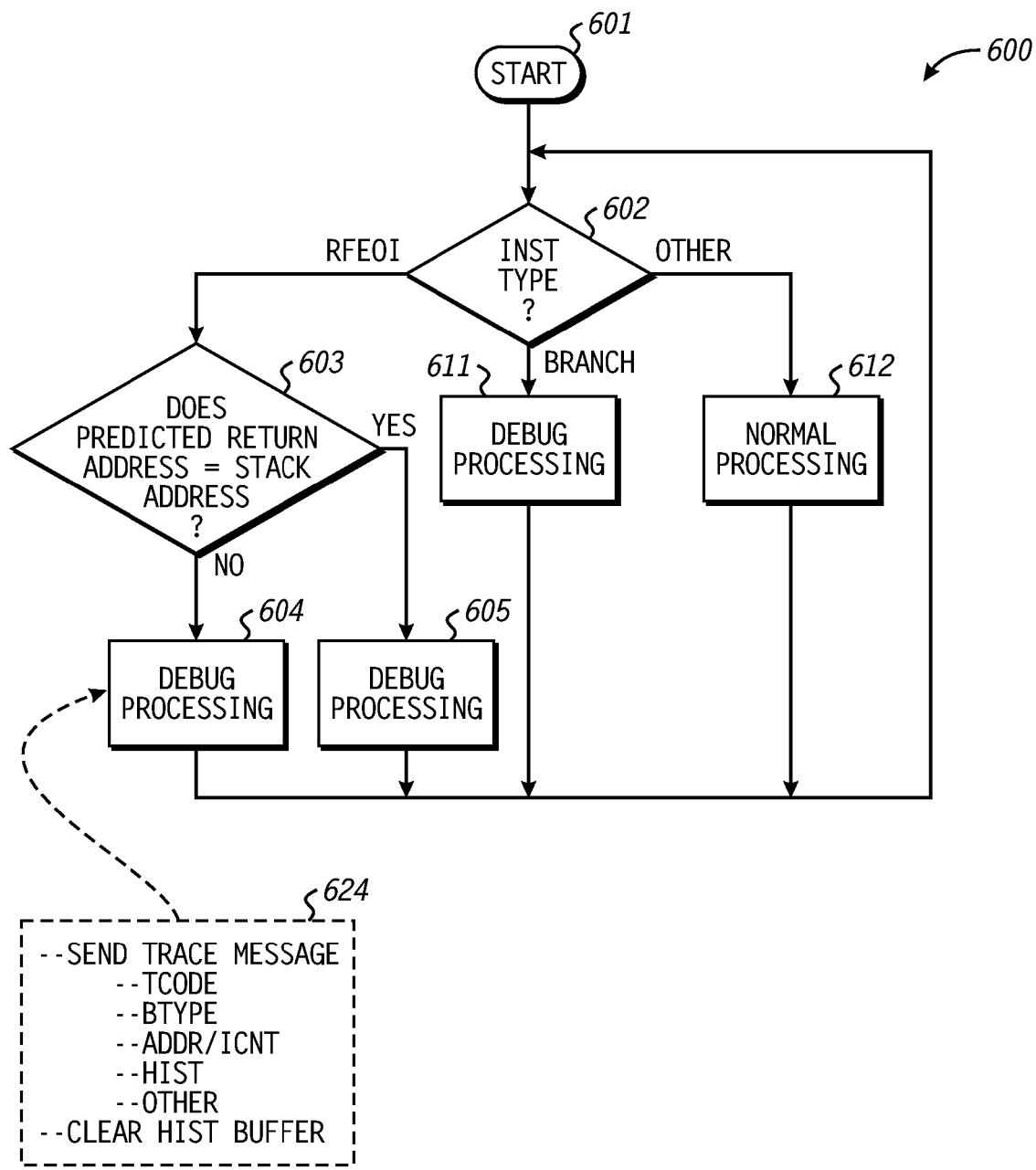
FIG. 6 illustrates a flow diagram illustrating a method of handling instructions, including return from exception/interrupt instructions, in accordance with at least one embodiment.

FIGS. 5 and 6 are flow diagrams indicating a manner in which exceptions and interrupts are handled by a data processor in accordance with a specific embodiment. As used herein, the term "exception/interrupt" is intended to refer to one of either an exception or an interrupt. The use of either the term "exception" or the term "interrupt" by itself is intended to refer specifically to an exception or an interrupt, respectively. The flow of FIG. 5 illustrates a particular embodiment of exception/interrupt processing that begins at block 501. At block 502, the exception/interrupt and debug processing portion of a data processor waits for the occurrence of an exception/interrupt. When an exception/interrupt is detected, processing proceeds to blocks 503 and 504, where exception/interrupt processing and debug processing are handled, respectively. It will be appreciated that the exception and debug processing of blocks 503 and 504 can occur concurrently, e.g. by different portions of a data processor, or, sequentially, e.g., using common resources of the data processor. Thus, an exception/interrupt processing portion of the data processor can implement various tasks to facilitate a change of instruction flow that results in the direction of instruction flow to the first instruction of an exception/handler, and a debug processing portion of the data processor can implement various debug processing tasks, such as managing an IFFB and generation of trace messages to communicate the occurrence of the exception/interrupt.

Block 503 represents tasks implemented by an exception/interrupt processor that occur during the redirection of instruction flow to an exception/interrupt handler, and various overhead tasks that are used to facilitate a return from the exception/interrupt when a Return From Exception (RFE) instruction or a Return From Interrupt (RFI) instruction is executed. As used herein, the term "RFEOI instruction" is intended to refer to one of either an RFE instruction or an RFI instruction.

Side block 513 indicates at least a portion of the various tasks performed at block 503 in accordance with a particular embodiment, including: 1) pushing an address based on an exceptional instruction onto a stack of the data processor, wherein the term "exceptional instruction" as used herein is intended to mean to the instruction that was being executed at the time an exception/interrupt occurred; 2) determining the destination address of the exception/interrupt, e.g., the first instruction of an exception/interrupt handler; and 3) loading a program counter of the data processor with the determined destination address. It will be appreciated that exception/interrupt handling can also perform additional tasks that are associated with redirecting processing in response to an exception/interrupt not described herein. For purposes of discussion, it is presumed herein that execution of the exceptional instruction is completed prior to processing of the exception/interrupt, and that the address value pushed onto the stack is the address of the instruction that follows the exceptional instruction that is used to redirect flow back to the point of exception/interrupt upon receipt of an RFEOI instruction, unless otherwise modified by the exception/interrupt handler.

The debug processing block 504 represents various debug tasks implemented by a debug processor of the data processor, in response to an exception/interrupt. Side block 514 indicates at least a portion of the various tasks performed at block 504 in accordance with a particular embodiment, including: 1) saving the address pushed on to the stack as a predicted return address; 2) capturing the destination address determined by the exception/interrupt processor (see block 503); 3) determining address information of the exceptional instruction and the destination address to be included in a trace message; 4) determining other trace message information, including TCODE, BTYPE; 5) trace history buffer handling, e.g., programming a corresponding flag of the IFFB, corresponding to the INDEX of a trace address message; 6) generating and transmitting one or more trace messages providing exception/interrupt information, such as AM (TCODE, INDEX, BTYPE, ICNT, ADDR), where, by way of example, INDEX and ICNT provide incremental address information that can be used by an external debugger to identify the location where the exception interrupt occurred, and ADDR provides direct address information identifying the address of the first instruction of an exception handler.

It will be appreciated that additional tasks can also be performed by the debug processor at 503, for example, an instruction indicator can be determined and communicated along with the trace address message that provides information that can be used to determine whether or not execution of the exceptional instruction was completed in response to the exception/interrupt.

FIG. 6 is a flow diagram beginning at 601 that indicates the manner in which a data processor handles various types of instructions, including branch instructions, and RFEOI instructions, in accordance with a specific embodiment. At block 602, the type of an executing instruction is determined Flow proceeds from block 602 to block 612 in response to the executing instruction being an instruction other than a branch or RFEOI instruction. At block 612 normal processing continues, which can include various debug processing (not shown), before returning to block 602.

Flow proceeds to from block 602 to block 611 in response to the executing instruction being a branch instruction. At block 611, the data processor handles branch debug processing in a predefined manner. For example, the specific embodiment of handling branch instructions as described above can be implemented at block 611. In an alternate embodiment, debug processing of branch instructions can be handled in other manners.

Flow proceeds to from block 602 to block 603 in response to the executing instruction being an RFEOI instruction. At block 603, a predicted return address of the RFEOI instruction is determined and compared to the actual return address that is taken in response to the RFEOI instruction. One way of determining the predicted return address is to use the address that was saved by the debugger at block 504 (FIG. 5), which was the address pushed onto the stack in response to the exception/interrupt. It will be appreciated, that this saved value is a predicted value in that the corresponding value that was originally pushed onto the stack may have changed. For example, the exception/interrupt handler could have changed the original return address pushed onto the stack.

When the address pushed onto the stack at block 504 has not been modified, the predicted return address of the RFEOI instruction will match the actual return address of the RFEOI instruction, and flow proceeds from block 603 to block 605, otherwise the predicted return address of the RFEOI instruction will not match the actual return address, and flow proceeds to block 604.

At block 605, in response to the predicted and actual RFEOI addresses matching, various debug processing is performed that includes IFFB processing, e.g., updating a flag of the IFFB that corresponds to the RFEOI instruction, and transmission of the IFFB content when the IFFB is full. Note, however, that there is no need to send a trace address message based solely on the fact that an RFEOI instruction was executed, because the return address information provided to the external debugger in the trace address message sent at block 504 was correct (e.g., the previously transmitted INDEX and ICNT information correctly identified the return location based upon instruction that was executing when the interrupt occurred). Thus the external debugger does not need any additional information to reconstruct the instruction flow.

If at block 603 it is determined that predicted return address does not match the actual return address, flow proceeds to block 604 for debug processing. At block 604, various debug processing is performed that includes IFFB processing, and generating a trace address message that provides address information identifying the actual return address of the RFEOI. Various processing is indicated at side block 624 that indicates a trace address message can be generated that includes a TCODE, a BTYPE, address information, and other information. The address information can be incremental address information or direct address information.

In addition, a history bit, e.g. a flag of the IFFB, is programmed that corresponds to the RFEOI instruction. Note that the value of the history bit is independent with respect to whether a match or mismatch occurred between the actual and predicted return addresses. In one embodiment, no history information is maintained indicating whether the predicted and actual addresses of particular RFEOI instructions resulted in a match or a mismatch.

By virtue of receiving the trace address message generated at block 604, the external debugger will know that the return address of the RFEOI cannot be determined from the previously provided information, which was based upon the location of the interrupted address, and will instead use the address information generated at block 604 to determine the return address, and reconstruct instruction flow. Conversely, when the external debugger does not receive a trace address message that corresponds to the RFEOI instruction, the external debugger knows that the previously received return address information is correct, based on the interrupted instruction, and will reconstruct the instruction flow based upon the that information.

Note that according to one embodiment, IFFB processing at block 604 and at block 605 both result in a flag of the IFFB that corresponds to the RFEOI instruction being programmed to a common value. For example, the bit of the IFFB that corresponds to the RFEOI instruction can be set at both block 604 and at block 605. Note that according to the present embodiment, there is no need to maintain a match/mis-match indicator for each occurrence of an exception/interrupt.

Figure 7:
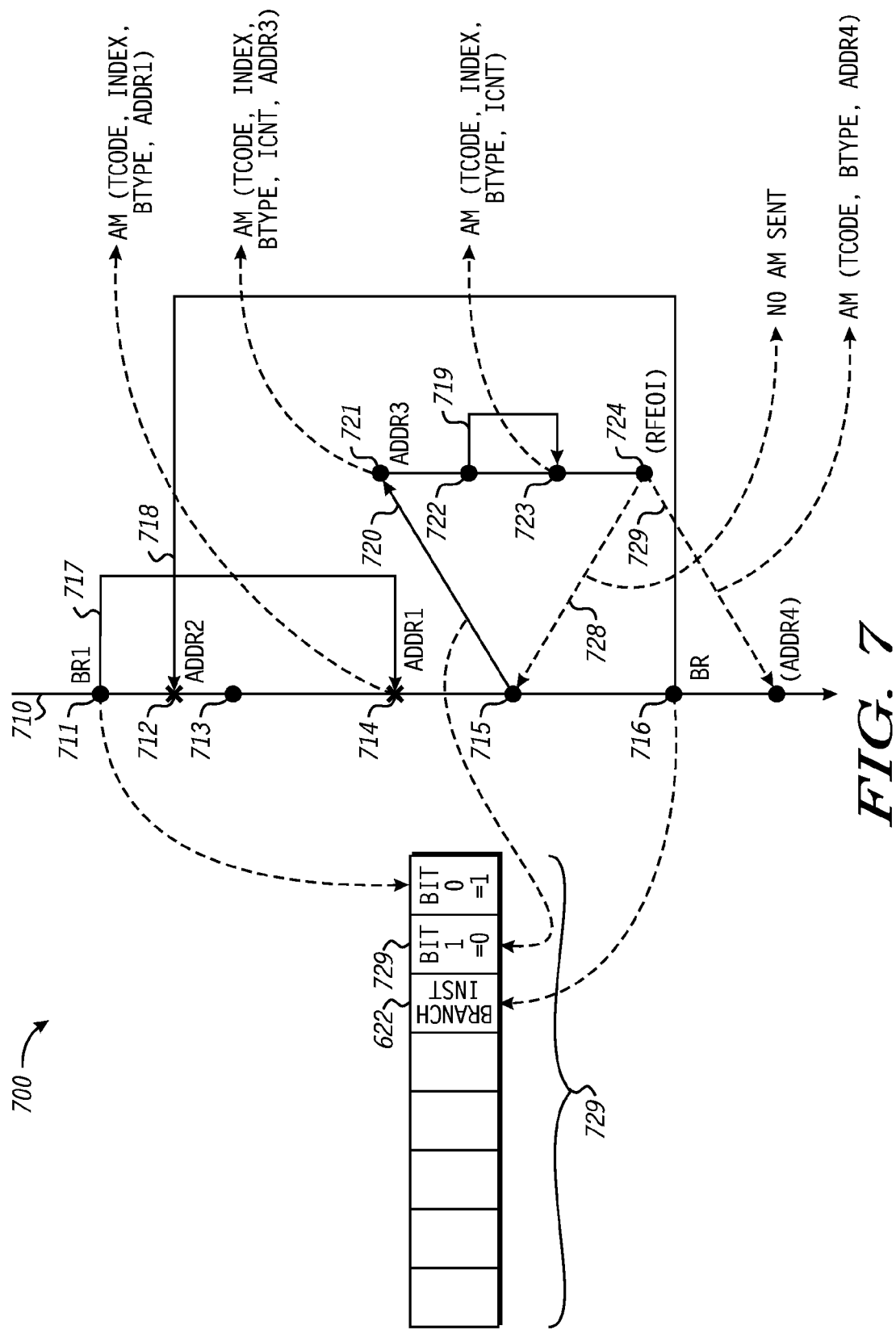
FIG. 7 illustrates a block diagram that represents a plurality of instructions in linear address space in accordance with at least one embodiment.

FIG. 7 illustrates a block diagram including a line 710 that represents a plurality of instructions in linear address space having a particular instruction flow during which an exception/interrupt occurs. In particular, as instructions 710 are executed, conditional branch instructions, can either be taken, or not taken, to another memory address as previously described. Thus, as instruction flow proceeds along line 710, each encountered branch instruction corresponds to a next available location in the IFFB where information is stored to indicate whether the branch was taken or not. Note that an IFFB 729 is illustrated at FIG. 7 to illustrate the manner in which IFFB flags are updated.

During operation, instructions are executed by a data processor until branch instruction 711 is reached, which by way of example is a conditional indirect branch instruction. In the example shown, it is determined that branch BR1 is to be taken to an instruction 714 at destination address ADDR1. Thus, the first flag (e.g., bit 0) of the IFFB 729 is set, assuming the IFFB 729 register was empty, and the resulting destination address (ADDR1) of the conditional branch is transmitted using a trace address message represented in FIG. 7 by the indicator AM(TCODE, INDEX, BTYPE, ADDR1), as previously described.

According to an embodiment, because register IFFB 729 is not full subsequent to the conditional branch BR1 being taken, no trace message will be sent at this time to communicate its contents. It will be appreciated however, that according to an alternate embodiment, valid flags of the register IFFB, e.g., those flags that correspond to executed branch instructions or other events, are transmitted in response to a conditional branch being taken, as opposed to waiting until the IFFB is full. In this embodiment, the trace address message that communicates the destination address may not need to include the index value.

Instruction code execution continues from instruction 714 and arrives at a instruction 715 when an exception/interrupt occurs. During exception/interrupt processing, the address of the exceptional instruction, for example, is pushed onto a stack of the data processor, such as stack 119 (FIG. 1), the destination address is determined, e.g., ADDR3 in the present example, and loaded into the data processor's program counter to cause instruction flow to proceed at instruction 721, as indicated by transition line 720.

In response to the exception/interrupt, a debug processor performs a variety of tasks, such as described at block 504 (FIG. 5). For example, debug processing results in generation of the trace address message illustrated in FIG. 7 to an exception/interrupt event will be better understood with reference to the exemplary pseudocode listing of Table 3, which has the same format as Table 1. Therefore, as illustrated, the pseudocode of Table 3 from address 0x100 through address 0x304 executes in the same manner as that previously described with respect to Table 1.

TABLE 3

| Label | Address | Instruction Type | IFFB | Index | Comment | Trace MSG Type |
|---|---|---|---|---|---|---|
| event_loop: | 0x100 | INSTR | 8'bxxxxxxxx | X | | |
| | 0x104 | INSTR | 8'bxxxxxxxx | X | | |
| | 0x108 | CBRdirect | 8'bxxxxxxx1 | 0 | Taken | None |
| jmp_table: | 0x200 | INSTR | 8'bxxxxxxx1 | X | | |
| | 0x204 | CBRindirect | 8'bxxxxxx01 | 1 | Not taken | |
| | 0x208 | INSTR | 8'bxxxxxx01 | X | | |
| | 0x20C | CBRindirect | 8'bxxxxx001 | 2 | Not taken | |
| | 0x210 | INSTR | 8'bxxxxx001 | X | | |
| | 0x214 | CBRindirect | 8'bxxxx1001 | 3 | Taken | AM(INDEX = 3) |
| do_something: | 0x300 | INSTR | 8'bxxxx1001 | X | | |
| | 0x304 | CBRdirect | 8'bxxx11001 | 4 | Taken | |
| | 0x30C | INSTR | 8'bxx111001 | 5 | E/I Occurs; Push 0x310 onto stack; load 0x500 into PC | AM(TCODE, BTYPE, INDEX = 5, ICNT, ADDR[e/i_handler]) |
| e/i_handler | 0x500 | INSTR | 8'bxx111001 | X | | AM |
| | 0x504 | CBRindirect | 8'bx0111001 | 6 | Not taken | |
| | 0x508 | CBRindirect | 8'b01111001 | 7 | Not taken | HM(TCODE, IFFB) |
| | 0x50C | CBRindirect | 8'bxxxxxxx0 | 0 | Not taken | |
| | 0x510 | INSTR | 8'bxxxxxxx0 | X | | |
| | 0x514 | RFEOI | 8'bxxxxxx10 | 1 | Predicted and actual return addresses match | No Trace message sent |
| end_handler | 0x310 | INSTR | 8'bxxxxxx10 | X | | | represented by the mnemonic AM (TCODE, INDEX, BTYPE, ICNT, ADDR3), where INDEX and ICNT represent address information that an external debugger can use to determine the exceptional instruction 715, and ADDR3 provides address information that allows the external debugger to determine the destination address of the exception/interrupt handler. In addition, the occurrence of the exception/interrupt causes a next bit, BIT 0, of the IFFB to be set.

The exception/interrupt handler instructions continue to be executed, including the conditional indirect branch instruction 722, which when taken results in a change of address flow to instruction 723. The taken branch instruction 722 results a trace address message being generated, as represented by the mnemonic AM(TCODE, INDEX, BTYPE, ICNT). Instruction flow continues until instruction 724, which is an RFEOI instruction.

In response to executing the RFEOI instruction, the debug module of the integrated circuit will compare the actual return address, e.g., the return address value loaded into the program counter of the data processor, with the predicted return address, e.g., the address of the exceptional instruction 715 which was previously saved. If the actual and predicted addresses match, as occurs when instruction flow follows dashed transition line 728, no address message is sent to the external debugger. If the actual and predicted instructions do not match, as occurs when instruction flow follows dashed transition line 729, and a trace address message represented by the mnemonic AM (TCODE, BTYPE, ADDR4) is generated, wherein ADDR4 is information identifying the actual taken address.

The manner in which various trace messages are generated and communicated to an external debugger in response During execution of the instruction at address 0x30C, however, an exception/interrupt occurs, which results in exception processing pushing the return address, 0x310, onto the stack of the data processor, and loading a destination address of the exception/interrupt into the program counter to redirect instruction flow. Also in response to the exception/interrupt, a debug processor will: 1) set the next available bit (BIT 5) of the IFFB, as indicated by the numeral 5 in the INDEX column, which corresponds to the occurrence of the exception/interrupt; 2) save the address of the exceptional instruction or the next sequential address for use as a predicted return address (FIG. 2); 3) generate a trace address message represented by the pneumonic AM (TCODE, BTYPE, INDEX=5, ICNT, ADDR[e/i_handler]), where the TCODE or BTYPE indicate that the message is for an exception/interrupt, INDEX=5 indicates that bit 5 of the IFFB corresponds to the exception/interrupt, and ADDR [e/i_handler] indicates the address information identifying the first address of the exception/interrupt handler is provided. Note that the IFFB is not full and therefore not yet transmitted via a trace history message.

The first instruction of the exception handler, at address 0x500, is a non-branch instruction, and therefore does not affect the IFFB, nor does any address information need to be transmitted. From address 0x500, execution proceeds to address 0x504, where another instruction is executed.

The instruction executed at address 0x504 is a conditional indirect branch instruction that is not taken. Because the branch is not taken, the next bit (BIT 6) of the IFFB is cleared, which allows the external debugger to know that the instruction flow continues at the next instruction, which is at address 0x508, and no trace address message is generated.

The instruction executed at address 0x508 is a conditional indirect branch instruction that is not taken. Because the branch is not taken, the next bit (BIT 7) of the IFFB is cleared, which allows the external debugger to know that the instruction flow continues at the next instruction and no trace address message is generated. However, a trace history message is generated as the IFFB is now full. The IFFB is cleared, and instruction flow continues at address 0x50C.

The instruction executed at address 0x50C is an indirect branch instruction that is not taken. Because the branch is not taken, the next bit (BIT 0) of the IFFB is cleared, which allows the external debugger to know that the instruction flow continues at the next instruction, which is at address 0x510, and no trace address message is generated.

Instruction 0x510 is a non-branch instruction, and therefore does not affect the IFFB, nor does any address information need to be transmitted. From address 0x510, execution proceeds to address 0x514, where another instruction is executed.

The instruction executed at address 0x514 is an RFEOI instruction that causes the instruction flow to be redirected 0x510 is a non-branch instruction, and therefore does not affect the IFFB, nor does any address information need to be transmitted.

Table 4 lists a pseudocode that is similar to a portion of the pseudocode of table 3, except that the actual return address and predicted return address of the RFEOI instruction do not match. Therefore, the results of executing the pseudocode of Table 4 from address 0x200 through 0x510 are the same as described with respect to Table 3. However, the RFEOI instruction executed at address 0x514 of Table 4 has resulted in a return address from the exception/interrupt that is different than the predicted, or expected, return address. This is detected by the debug processing module of the data processor, e.g., by comparing a value stored at memory 120 to the value loaded in the program counter. As a result, a trace address message is generated having the actual return address information that is needed by the debugger. Thus, Table 4 indicates that a trace address message represented by the mnemonic AM(TCODE, BTYPE, INDEX=1, ADDR[end_handler]) is sent based upon execution of the RFEOI instruction at address 0x514.

TABLE 4

| Label | Address | Instruction Type | IFFB | Index | Comment | Trace MSG Type |
|---|---|---|---|---|---|---|
| jmp_table: | 0x200 | INSTR | 8'bxxxxxxx1 | X | | |
| | 0x204 | CBRindirect | 8'bxxxxxx01 | 1 | Not taken | |
| | 0x208 | INSTR | 8'bxxxxxx01 | X | | |
| | 0x20C | CBRindirect | 8'bxxxxx001 | 2 | Not taken | |
| | 0x210 | INSTR | 8'bxxxxx001 | X | | |
| | 0x214 | CBRindirect | 8'bxxxx1001 | 3 | Taken | AM(INDEX = 3) |
| do_something: | 0x300 | INSTR | 8'bxxxx1001 | X | | |
| | 0x304 | CBRdirect | 8'bxxx11001 | 4 | Taken | |
| | 0x30C | INSTR | 8'bxx111001 | 5 | E/I Occurs; Push 0x310 onto stack; load 0x500 into PC | AM(TCODE, BTYPE, INDEX = 5, ICNT, ADDR[e/i_handler]) |
| e/i_handler | 0x500 | INSTR | 8'bxx111001 | X | | AM |
| | 0x504 | CBRindirect | 8'bx0111001 | 6 | Not taken | |
| | 0x508 | CBRindirect | 8'b01111001 | 7 | Not taken | HM(TCODE, IFFB) |
| | 0x50C | CBRindirect | 8'bxxxxxxx0 | 0 | Not taken | |
| | 0x510 | INSTR | 8'bxxxxxxx0 | X | | |
| | 0x514 | RFEOI | 8'bxxxxxx10 | 1 | Predicted and actual return addresses do not match | AM(TCODE, BTYPE, INDEX = 1, ADDR[end_handler]) |
| end_handler | 0x710 | INSTR | 8'bxxxxxX10 | X | | | from the exception/interrupt handler to the instruction following the exceptional instruction, which is at address 0x30C. Because a change of flow occurs, the next bit (BIT 1) of the IFFB is set, which indicates that an instruction redirection has occurred. Because the RFEOI instruction caused the instruction flow to be redirected to the predicted instruction, e.g., the predicted and actual return address matched, as evidenced in Table 3 by the instruction 0x310 being the instruction executed after the RFEOI instruction at address 0x514, no trace address message is sent. Instruction The initial pseudocode of Table 5 is the same as the initial pseudocode of Table 3. Therefore, from address 0x100 through address 0x304 the pseudocode of Table 5 implements the same operation as the psuedocode of Table 3, but is handled differently by the debug processor. In particular, instead of generating messages with index values, and completely filling the IFFB before generating a trace history message, the embodiment of Table 5 maintains a variable size IFFB that is transmitted each time a trace address message is sent for a branch instruction or for an exception/interrupt event.

TABLE 5

| Label | Address | Instruction Type | IFFB | Comment | Trace MSG Type |
|---|---|---|---|---|---|
| event_loop: | 0x100 | INSTR | 1'b1 | | |
| | 0x104 | INSTR | 1'b1 | | |
| | 0x108 | CBRdirect | 2'b11 | Taken | None |

TABLE 5-continued

| Label | Address | Instruction Type | IFFB | Comment | Trace MSG Type |
|---|---|---|---|---|---|
| jmp_table: | 0x200 | INSTR | 2'b11 | | |
| | 0x204 | CBRindirect | 3'b110 | Not taken | |
| | 0x208 | INSTR | 3'b110 | | |
| | 0x20C | CBRindirect | 4'b1100 | Not taken | |
| | 0x210 | INSTR | 4'b1100 | | |
| | 0x214 | CBRindirect | 5'b11001 | Taken | AHM(TCODE, BTYPE, ADDR, HIST = 4b1001) |
| do_something: | 0x300 | INSTR | 1'b1 | | |
| | 0x304 | CBRdirect | 2'b11 | Taken | |
| | 0x30C | INSTR | 3'b111 | E/I Occurs | AHM(TCODE, BTYPE, ICNT, ADDR, HIST = 2b11) |
| e/i_handler | 0x500 | INSTR | 1'b1 | | |
| | 0x504 | CBRindirect | 2'b10 | Not taken | |
| | 0x508 | CBRindirect | 3'b100 | Not taken | |
| | 0x50C | CBRindirect | 4'b1000 | Not taken | |
| | 0x510 | INSTR | 4'b1000 | | |
| | 0x514 | RFEOI | 5'b10001 | | |
| end_handler | 0x310 | INSTR | 1'b1 | | |

For example, at address 0x100 there are no flags stored in the IFFB buffer, as represented by the value 1'b1, where the portion "1'b" of the term "1'b1" indicates that the term represents one binary bit, which follows the portion "1'b". Thus, the term 1'b1 represents a single bit value of "1", which corresponds to a stop bit. At instruction 0x108, however, a set flag has been added to the IFFB, as represented by the value 2'b11, based upon execution of the direct branch instruction at address 0x100. Because the instruction flow of a direct branch instruction can be predicted by an external debugger, no trace address message is generated.

Instruction flow continues as described previously, until address 0x204, which is a conditional indirect branch instruction that is not taken. This results in a cleared flag being added to the IFFB, as represented by the value 3'b110. Because the instruction flow following a not taken conditional indirect branch can be predicted by an external debugger, no trace address message is generated.

At address 0x20C another cleared bit is added to the IFFB to indicate the conditional indirect branch was not taken resulting in the IFFB value 4'b1100. At address 0x214 a conditional indirect branch is taken, which results in a set flag being added to the IFFB, as represented by the IFFB value 5'b11001. Furthermore, because the external debugger has no way of knowing the destination address of a taken indirect branch, a trace address/history message is shown to be generated that provides address information of the destination instruction, and the contents of the IFFB. The trace address/history message is represented by the mnemonic AHM(TCODE, BTYPE, ADDR, HIST), where HIST represents information needed to report the four IFFB flags, represented by the value 4'b1001, of the IFFB.

Instruction flow continues at instruction 0x300 following the taken branch. The contents of IFFB have been cleared in response to the branch instruction at address 0x214 having been taken.

Instruction flow continues, with the IFFB being updated as described above, until instruction 0x30C, during which an execution/interrupt occurs. In response, a set flag is added to the IFFB, as indicated by the value 3'b111. Furthermore, because the external debugger has no way of knowing that the exception/interrupt occurred, a trace address message is generated that reports 1) the occurrence of the interrupt, e.g., via a particular BTYPE or TCODE value, 2) the address of the destination instruction, and 3) the contents of the IFFB. The trace address message reported is illustrated to have the mnemonic AHM(TCODE, BTYPE, ICNT, ADDR, HIST), where ICNT indicates the number of instruction executed between the last branch instruction and the exception/interrupt, which allows the external debugger to determine where the exception/interrupt happened, and HIST represents information needed to report the two IFFB flags currently stored in the IFFB, e.g., 2'11.

Instruction flow continues at instruction 0x500, with the IFFB being updated as described above, until the RFEOI instruction at address 0x514, at which time a set flag is added to the IFFB, as indicated by the value 5'b10001, that corresponds to the RFEOI instruction. Furthermore, the debug processor determines that the actual return address from the RFEOI instruction matched the predicted return address, and therefore does not generate a trace address/history message, as the external debugger can determine the return address from the ICNT value that was previously generated in response to the interrupt. Thus, the debug processor does not need to transmit either destination address information or the contents of the IFFB at this time. It will be appreciated, however, that if the predicted return address did not match the actual return address, that the debug process would generate a trace address message represented by the mnemonic AM(TCODE, BTYPE, ADDR, HIST=5'b10001) to convey the taken return address.

Figure 8:
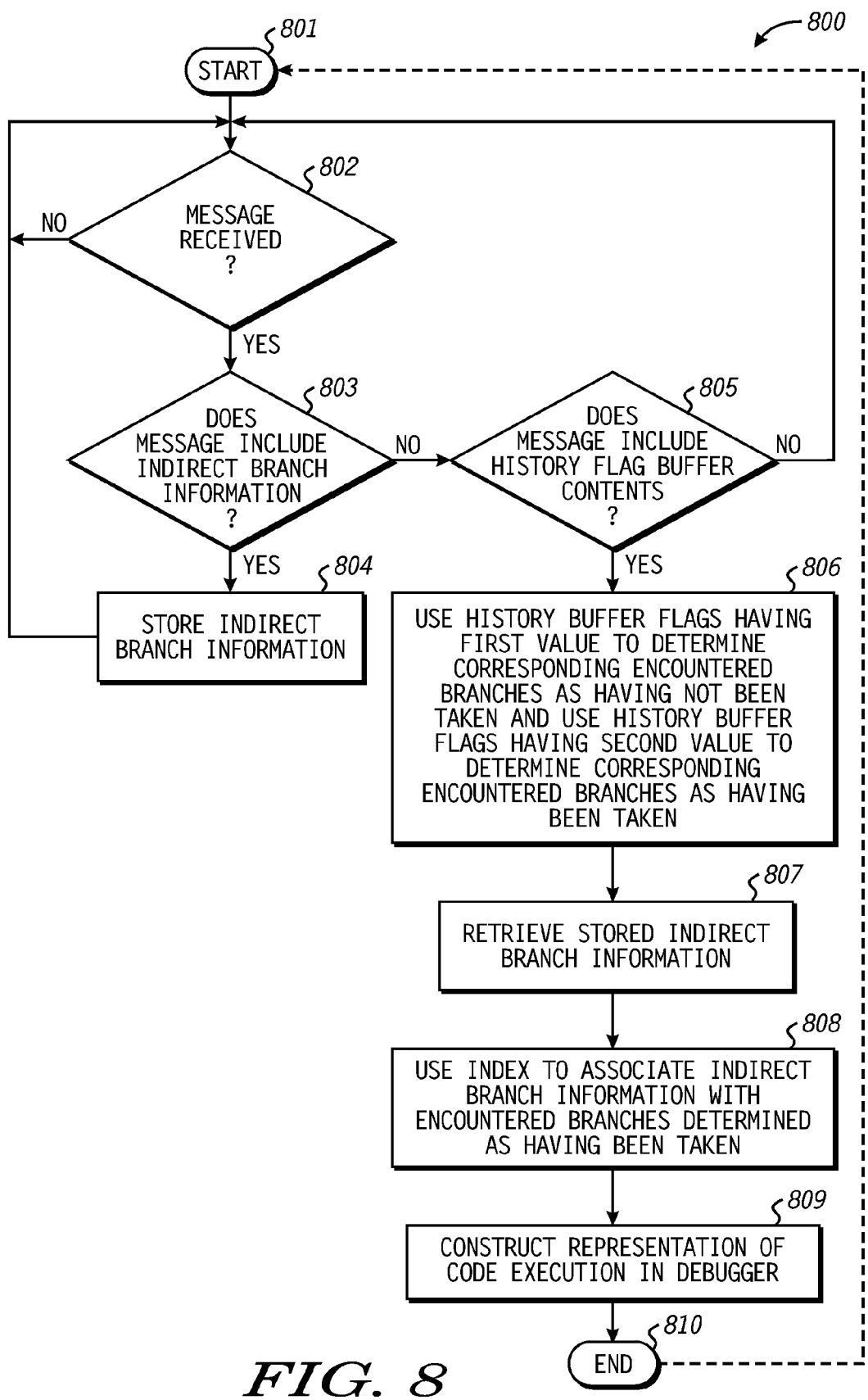
FIG. 8 is a flow diagram illustrating a method for trace history buffer utilization improvement in accordance with at least one embodiment suitable for implementation, for example, in an external debugger.

FIG. 8 is a flow diagram illustrating a method for determining program trace information at the external debugger 103, based upon messages using index values as described herein. Method 800 begins in block 801. From block 801, method 800 continues to decision block 802. In decision block 802, a decision is made as to whether or not a message has been received. If not, method 800 returns to decision block 802. If so, method 800 continues to decision block 803. In decision block 803, a decision is made as to whether or not the message includes indirect branch information, which can be indicated by a particular TCODE or BYTPE value. If so, method 800 continues to block 804. In block 804, indirect branch information is stored and used by the external debugger to determine instruction flow. From block 804, method 800 returns to decision block 802. If a decision is made in decision block 803 that the message does not include indirect branch information, method 800 continues to decision block 805. In decision block 805, a decision is made as to whether or not the message includes IFFB contents. If not, method 800 returns to decision block 802. If so, method 800 continues to block 806.

In block 806, flags of the IFFB buffer that are cleared used to determine corresponding branches in the debugger's copy of the instruction code as not having been taken, and flags that are set are used to determine corresponding branches in the debugger's copy of the instruction code as having been taken. From block 806, method 800 continues to block 808. In block 808, stored indirect branch information is retrieved, and flow proceeds to block 808, where indirect branch information is associated with branch instructions that are determined as having been taken. From block 808, method 800 continues to block 809. In block 809, a representation of code execution is constructed in the debugger. From block 809, method 800 continues to block 810, where it ends.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention.

For example, debugger 103 may obtain the values of any or all of registers 110-115, for example, by receiving trace messages via connection 108, which may, for example, be a serial port or a parallel port for conveying trace messages. For example, data processor 101 may provide the values of any or all of registers 110-115 to debugger 103. Alternatively, a Joint Test Access Group (JTAG) connection allowing debugger 103 to access a memory map of data processor 101, may allow access to memory 102, registers 110-115, memory external to data processor 101, and the like. In such case, debug module 116 may store values that may otherwise be stored in registers 110-115 at any memory locations accessible to debug module 116 and debugger 103. Debugger may use such values to trace program code instructions being executed on data processor 101. Such tracing may be performed in real-time (i.e., as the program code instructions are being executed by execution units 117 of data processor 101). Examples of operations that may be performed in real-time include the storing of values in registers 110-115 of debug module 116, the transmission of trace messages from debug module 116 to debugger 103, the analysis of trace messages at debugger 103, and the like.

In other embodiments, instruction flow history flag buffer register 114 may have additional bits. For example, additional bits, may be stored in instruction flow history flag buffer register 114 by shifting bits already stored in instruction flow history flag buffer register 114 away from an end of instruction flow history flag buffer register 114 at which the additional bit or bits is to be stored and storing the additional bit or bits at that end of instruction flow history flag buffer register 114.

In another embodiment, a trace address message that communicates the occurrence of an exception/interrupt can include an instruction type field that includes an indicator as to whether execution of the exceptional instruction completed or aborted. This information can be used by the debugger to determine proper instruction flow in response to an RFEOI instruction.

In a first aspect of the present disclosure, a method can include, in response to an occurrence of an exception/interrupt, executing an exception/interrupt handler, determining if a predicted return address of a Return From Exception Or Interrupt (RFEOI) instruction of the exception/interrupt handler results in a match or a mismatch with an actual return address of the RFEOI instruction, and generating a first trace address message identifying the actual return address in response to determining the mismatch, otherwise, not generating the trace address message identifying the actual return address in response to determining match.

In an embodiment of the first aspect, the predicted return address is based upon an address of an exceptional instruction. In a particular embodiment, the predicted return address is the same as the address of the exceptional instruction that was being executed. In a further particular embodiment, the predicted return address is an address of an instruction after the exceptional instruction.

In another embodiment of the first aspect, the method includes, prior to determining the match or mismatch, generating a second trace address message in response to occurrence of the exception/interrupt, the second trace address message comprising information from which the predicted return address can be determined. In a particular embodiment, the information includes an indicator whether execution of the exceptional instruction was completed. In an even more particular embodiment, the method includes in response to the instruction type indicating the exceptional instruction is of a first type the predicted address has a first value, and in response to the instruction type indicating the exceptional instruction is of a second type the predicted address has a second value.

In yet another embodiment of the first aspect, the method includes, in response to the exception/interrupt, generating a trace history message having a first indicator corresponding to the exception/interrupt, wherein the trace history message is generated independent as to a fullness of a history buffer comprising the first indicator. In a particular embodiment, the generated trace history message further comprises a second indicator corresponding to execution of a branch instruction.

In still another embodiment of the first aspect, the method includes, in response to the exception/interrupt, adding a first indicator corresponding to the exception/interrupt to a history buffer, wherein a trace history message comprising the first indicator is generated in response to the history buffer meeting a fullness criteria. In still yet another further embodiment of the first aspect, the method includes asserting a history indicator in response to the RFEOI instruction being executed, wherein the history indicator is asserted independent of determining match or mismatch. In even another embodiment of the first aspect, the method includes no history information is maintained indicating whether the match or mismatch was detected.

In a second aspect of the disclosure, a data processing system can include a data processor core, and a debug module coupled to the data processor core, the debug module configured to determine if a predicted return address of an Return From Exception or Return from Interrupt (RFEOI) instruction results in a match or a mismatch with an actual return address of the RFEOI instruction, and to send a trace address message identifying the actual return address in response to determining mismatch, otherwise, not sending the trace address message in response to determining match.

In an embodiment of the second aspect, the debug module determines the predicted return address based upon an address of an exceptional instruction. In another embodiment of the first aspect, the debug module is further configured to, prior to determining the match or mismatch, generate a second trace address message in response to occurrence of an exception/interrupt, the second trace address message comprising information from which the predicted return address can be determined. In a particular embodiment, the information includes an instruction type of an exceptional instruction.

In yet another embodiment of the second aspect, the debug module is further configured to, in response to an exception/interrupt corresponding the RFEOI instruction, generate a trace history message having a first indicator corresponding to the exception/interrupt instruction independent as to fullness of a trace history buffer comprising the first indicator. In still another particular embodiment, the debug module is further configured to, in response to an exception/interrupt corresponding the RFEOI instruction, add a first indicator corresponding to the exception/interrupt to a history buffer, and to generate a trace history message based upon the history buffer in response to the history buffer meeting a fullness criteria.

In a third aspect of the present disclosure, a method can include determining that a Return From Exception Or Interrupt (RFEOI) instruction has been executed at a data processor, and in response to determining that a first trace address message has been received corresponding to the RFEOI instruction, reporting instruction flow subsequent to the RFEOI instruction as continuing at a first return address provided as part of the first trace address message, otherwise, in response to determining that a first trace address message has not been received corresponding to the RFEOI instruction, reporting instruction flow subsequent to the RFEOI instruction as continuing at a second return address that is based upon information received prior to execution of the RFEOI instruction.

In an embodiment of the third aspect, the method includes receiving a second trace address message providing the second return address, the second trace address message received in response to an occurrence of an exception/interrupt event, and the second return address based upon the address of an exceptional instruction.

Those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:
   in response to an occurrence of an exception/interrupt, executing an exception/interrupt handler;
   determining if a predicted return address of a Return From Exception Or Interrupt (RFEOI) instruction of the exception/interrupt handler results in a match or a mismatch with an actual return address of the RFEOI instruction; and
   generating a first trace address message identifying the actual return address in response to determining the mismatch, otherwise, not generating the trace address message identifying the actual return address in response to determining match.

2. The method of claim 1, wherein the predicted return address is based upon an address of an exceptional instruction.

3. The method of claim 2, wherein the predicted address is the same as the address of the exceptional instruction that was being executed.

4. The method of claim 2, wherein the predicted address is an address of an instruction after the exceptional instruction.

5. The method of claim 1 further comprising:
   prior to determining the match or mismatch, generating a second trace address message in response to occurrence of the exception/interrupt, the second trace address message comprising information from which the predicted return address can be determined.

6. The method of claim 5, wherein the information includes an indicator whether execution of the exceptional instruction was completed.

7. The method of claim 6, wherein in response to the instruction type indicating the exceptional instruction is of a first type the predicted address has a first value, and in response to the instruction type indicating the exceptional instruction is of a second type the predicted address has a second value.

8. The method of claim 1 further comprising:
   in response to the exception/interrupt, generating a trace history message having a first indicator corresponding to the exception/interrupt, wherein the trace history message is generated independent as to a fullness of a history buffer comprising the first indicator.

9. The method of claim 8, wherein the generated trace history message further comprises a second indicator corresponding to execution of a branch instruction.

10. The method of claim 1 further comprising:
    in response to the exception/interrupt, adding a first indicator corresponding to the exception/interrupt to a history buffer, wherein a trace history message comprising the first indicator is generated in response to the history buffer meeting a fullness criteria.

11. The method of claim 1 further comprising:
    asserting a history indicator in response to the RFEOI instruction being executed, wherein the history indicator is asserted independent of determining match or mismatch.

12. The method of claim 1, wherein no history information is maintained indicating whether the match or mismatch was detected.

13. A data processing system comprising:
    a data processor core; and
    a debug module coupled to the data processor core, the debug module configured
       to determine if a predicted return address of an Return From Exception or Return from Interrupt (RFEOI) instruction results in a match or a mismatch with an actual return address of the RFEOI instruction, and
       to send a trace address message identifying the actual return address in response to determining mismatch, otherwise, not sending the trace address message in response to determining match.

14. The data processing system of claim 13, wherein debug module determines the predicted return address based upon an address of an exceptional instruction.

15. The data processing system of claim 13, wherein the debug module is further configured to, prior to determining the match or mismatch, generate a second trace address message in response to occurrence of an exception/interrupt, the second trace address message comprising information from which the predicted return address can be determined.

16. The data processing system of claim 15, wherein the information includes an instruction type of an exceptional instruction.

17. The data processing system of claim 13, wherein the debug module is further configured to, in response to an exception/interrupt corresponding the RFEOI instruction, generate a trace history message having a first indicator corresponding to the exception/interrupt instruction independent as to fullness of a trace history buffer comprising the first indicator.

18. The data processing system of claim 13, wherein the debug module is further configured to, in response to an exception/interrupt corresponding the RFEOI instruction, add a first indicator corresponding to the exception/interrupt to a history buffer, and to generate a trace history message based upon the history buffer in response to the history buffer meeting a fullness criteria.

19. A method comprising:
determining that a Return From Exception Or Interrupt (RFEOI) instruction has been executed at a data processor;
in response to determining that a first trace address message has been received corresponding to the RFEOI instruction, reporting instruction flow subsequent to the RFEOI instruction as continuing at a first return address provided as part of the first trace address message, otherwise, in response to determining that a first trace address message has not been received corresponding to the RFEOI instruction, reporting instruction flow subsequent to the RFEOI instruction as continuing at a second return address that is based upon information received prior to execution of the RFEOI instruction.

20. The method of claim 19 further comprising:
receiving a second trace address message providing the second return address, the second trace address message received in response to an occurrence of an exception/interrupt event, and the second return address based upon the address of an exceptional instruction.

* * * * *